United States Patent
Yamasaki et al.

(10) Patent No.: US 7,578,942 B2
(45) Date of Patent: Aug. 25, 2009

(54) WASTEWATER TREATMENT EQUIPMENT AND METHOD OF WASTEWATER TREATMENT

(75) Inventors: Kazuyuki Yamasaki, Hiroshima (JP); Keichiro Uda, Kyoto-fu (JP); Kazumi Chuhjoh, Kagawa-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 98 days.

(21) Appl. No.: 11/816,880

(22) PCT Filed: Jan. 31, 2006

(86) PCT No.: PCT/JP2006/301553

§ 371 (c)(1),
(2), (4) Date: Aug. 22, 2007

(87) PCT Pub. No.: WO2006/092920

PCT Pub. Date: Sep. 8, 2006

(65) Prior Publication Data

US 2009/0020474 A1  Jan. 22, 2009

(30) Foreign Application Priority Data

Mar. 3, 2005  (JP) .............................. 2005-059275

(51) Int. Cl.
 C02F 1/72 (2006.01)
 C02F 1/00 (2006.01)
 C02F 1/68 (2006.01)
(52) U.S. Cl. ..................... 210/758; 210/744; 210/746; 210/749; 210/765; 210/97; 210/101; 210/109; 210/134; 210/150; 210/220; 210/221.2; 210/259; 261/DIG. 75
(58) Field of Classification Search ............... None
See application file for complete search history.

(56) References Cited

U.S. PATENT DOCUMENTS

| 5,314,644 | A  | * | 5/1994  | Michelsen et al. ............ 261/84 |
| 6,209,855 | B1 | * | 4/2001  | Glassford ..................... 261/28 |
| 6,830,690 | B2 | * | 12/2004 | Schmid ...................... 210/609 |
| 2006/0054205 | A1 |  | 3/2006 | Yabe et al. |
| 2009/0020474 | A1 |  | 1/2009 | Yamasaki et al. |

FOREIGN PATENT DOCUMENTS

| JP | 51-124666 | 10/1976 |
| JP | 52-129677 | 10/1977 |
| JP | 62-197197 | 8/1987 |
| JP | 04-083594 | 3/1992 |

(Continued)

OTHER PUBLICATIONS

English translation of the International Preliminary Report on Patentability mailed Sep. 20, 2007 in corresponding PCT application PCT/JP2006/301553.

(Continued)

*Primary Examiner*—Duane Smith
*Assistant Examiner*—Paul J Durand
(74) *Attorney, Agent, or Firm*—Nixon & Vanderhye P.C.

(57) ABSTRACT

In wastewater treatment equipment, a surfactant is added to a micronanobubble reaction vessel 3 by using a surfactant pump 8 and a surfactant tank 9 which constitute a surfactant adding section. Thereby, a micronanobubble generator 4 stably and efficiently produces micronanobubbles in the treatment water as raw water containing the surfactant in the micronanobubble reaction vessel 3. Thus, the micronanobubbles make it possible to efficiently pretreat the wastewater introduced into the micronanobubble reaction vessel. Consequently, it becomes possible not only to enhance efficiency of wastewater treatment but also to reduce a treatment load on wastewater treatment equipment 14 in a step subsequent to the pretreatment. Thereby, scale of the wastewater treatment equipment 14 is reduced.

9 Claims, 5 Drawing Sheets

FOREIGN PATENT DOCUMENTS

| | | |
|---|---|---|
| JP | 07-195091 | 8/1995 |
| JP | 10-047649 | 2/1998 |
| JP | 10-128377 | 5/1998 |
| JP | 11-047738 | 2/1999 |
| JP | 11-057772 | 3/1999 |
| JP | 11-151486 | 6/1999 |
| JP | 11-333490 | 12/1999 |
| JP | 2000-167555 | 6/2000 |
| JP | 3095620 | 8/2000 |
| JP | 2000-271577 | 10/2000 |
| JP | 2000-279975 | 10/2000 |
| JP | 2000-308900 | 11/2000 |
| JP | 2001-038348 | 2/2001 |
| JP | 2001-198584 | 7/2001 |
| JP | 2002-143885 | 5/2002 |
| JP | 2003-033625 | 2/2003 |
| JP | 2003-071256 | 3/2003 |
| JP | 2003-094086 | 4/2003 |
| JP | 3467671 | 9/2003 |
| JP | 2003-284946 | 10/2003 |
| JP | 2003-334548 | 11/2003 |
| JP | 2004-121962 | 4/2004 |
| JP | 2004-290735 | 10/2004 |

OTHER PUBLICATIONS

U.S. Appl. No. 11/816,985, filed Aug. 23, 2007, entitled "Wastewater Treatment Method and Wastewater Treatment Equipment".

International Search Report for PCT/JP2006/301553 mailed May 2, 2006.

Kukizaki et al., "Generation of Monodisperse Nanometer Bubbles Through a Porous Membrane and Control of Bubble Sizes," pp. 654-659 (2004).

Takagi et al., "Behavior of Rising Bubbles in Water Containing Surfactant," pp. 16-23 (2003).

English translation of the International Preliminary Report on Patentability mailed Sep. 20, 2007 in PCT application PCT/JP2006/301551.

International Search Report for PCT/JP2006/301552 mailed May 2, 2006.

English translation of the International Preliminary Report on Patentability mailed Sep. 20, 2007 in PCT application PCT/JP2006/301552.

U.S. Appl. No. 11/816,867, filed Aug. 22, 2007, entitled "Waste Gas/Wastewater Treatment Equipment and Method of Treating Waste Gas/Wastewater".

\* cited by examiner

WASTEWATER TREATMENT EQUIPMENT AND METHOD OF WASTEWATER TREATMENT

This application is the U.S. national phase of International Application No. PCT/JP2006/301553, filed Jan. 31, 2006, which designated the U.S. and claims priority to Japanese Patent Application No. 2005-059275, filed Mar. 3, 2005, the entire contents of each of which are hereby incorporated by reference.

TECHNICAL FIELD

The present invention relates to wastewater treatment equipment and a method of wastewater treatment. The present invention relates to, for example, wastewater treatment equipment and a method of wastewater treatment in which micronanobubbles are effectively produced for pretreatment of wastewater so that a load on the wastewater treatment equipment can be reduced to thereby allow downsizing of the entire wastewater treatment equipment and enhancement of treated water quality.

BACKGROUND ART

In the methods of wastewater treatment and wastewater treatment equipment, there have been some methods and devices as general pretreatment methods and pretreatment devices. For example, there are pretreatment devices which perform settling, filtration, pH control, ozone oxidation, adsorption and the like as pretreatment devices in biological treatment equipment. These pretreatment devices aim at reducing biological, chemical and physical loads on the wastewater treatment equipment in the subsequent step, so that it can be expected to reduce scale of the wastewater treatment equipment and to enhance treatment quality of treated water from the wastewater treatment equipment.

As a prior art, a treatment method and a device using nanobubbles are disclosed in Patent Document 1 (JP 2004-121962 A). This prior art utilizes such characteristics of nanobubbles as decrease in buoyancy, increase in air bubble surface area, increase in surface activity, generation of local high pressure fields, a surface active property and an antiseptic property attained by achievement of electrostatic polarization. Specifically, it has been disclosed that by associating these characteristics with each other, a contamination component adsorption function, a substance surface high-speed cleaning and an antiseptic function allow advanced cleaning of various substances with low environmental load so that the contaminated water can be purified.

As yet another prior art, a nanobubble generation method is disclosed in Patent Document 2 (JP 2003-334548 A). This prior art is composed of (1) a step of gasifying part of liquid by decomposition in liquids, (2) a step of applying ultrasonic waves in liquids, or (3) a step of gasifying part of liquid by decomposition and a step of applying ultrasonic waves.

While the properties and functions of micronanobubbles are under research and development, methods and equipment for effective generation of micronanobubbles are being researched. Generally, microbubbles are defined as microscopic bubbles with a diameter of 50 micrometers or smaller, whereas nanobubbles are defined as microscopic bubbles with a diameter of less than 1 micrometer.

However, there have been technical problems in concurrent generation of both the microbubbles and the nanobubbles. When the microbubbles are discharged into water, the water becomes white like milk. The water stays in the whitish state for a few minutes even after the generation of the microbubbles is stopped. However, if the conditions for the microbubbles generation are inappropriate, there occurs a phenomenon that the microbubbles fail to be generated, let alone nanobubbles.

In wastewater treatment, it is important to stably generate micronanobubbles in water for effective fulfillment of the functions of the micronanobubbles.

DISCLOSURE OF INVENTION

Subjects to be Solved by the Invention

It is an object of the present invention to provide wastewater treatment equipment and a method of wastewater treatment allowing stable generation of micronanobubbles and enhancement of wastewater treatment efficiency.

Means for Solving the Subjects

To achieve the above-mentioned object, the present invention provides a method of wastewater treatment, comprising the steps of:

introducing wastewater into a micronanobubble reaction vessel having a micronanobubble generator; and adding a surfactant to the micronanobubble reaction vessel.

According to the method of wastewater treatment in the present invention, a surfactant is added to the micronanobubble reaction vessel, so that the micronanobubble generator can generate micronanobubbles stably and efficiently in the treatment water, as raw water containing the surfactant, in the micronanobubble reaction vessel. Consequently, the wastewater introduced into the micronanobubble reaction vessel can efficiently be pretreated by the micronanobubbles. This makes it possible to reduce a treatment load on a wastewater treatment section in the step subsequent to the pretreatment and to reduce the scale of the wastewater treatment section in the subsequent step.

The present invention also provides wastewater treatment equipment, comprising:

a micronanobubble reaction vessel for receiving wastewater and having a micronanobubble generator; and a surfactant adding section for adding a surfactant to the micronanobubble reaction vessel.

According to the wastewater treatment equipment in the present embodiment, a surfactant is added to the micronanobubble reaction vessel by the surfactant adding section so as to allow stable and efficient generation of micronanobubbles in the micronanobubble reaction vessel. Therefore, it becomes possible not only to efficiently pretreat the wastewater introduced into the micronanobubble reaction vessel by using micronanobubbles, so as to thereby attain enhancement of wastewater treatment efficiency, but also to reduce a treatment load on a wastewater treatment section in the step subsequent to the pretreatment, so as to thereby allow reduction in scale of the wastewater treatment section.

In the method of wastewater treatment of one embodiment, air is sucked from an air suction pipe connected to the micronanobubble generator into the micronanobubble generator a surfactant is added to the micronanobubble reaction vessel from a surfactant pump, and a liquid level in the micronanobubble reaction vessel is detected by a liquid-level meter, and based on a liquid level detection signal outputted by the liquid-level meter, at least one of an opening and closing degree of an electromagnetic valve for adjusting an air flow rate of the air suction pipe and a discharge rate of the surfactant pump is controlled.

According to the method of wastewater treatment in the present embodiment, when the amount of air sucked from the air suction pipe into the micronanobubble generator in the micronanobubble reaction vessel is not appropriate but excessive, bubbles larger than micronanobubbles are generated in the micronanobubble reaction vessel. In this case, the bubble level ascends in the micronanobubble reaction vessel. This is sensed by the liquid-level meter, so that the liquid-level meter outputs a liquid level detection signal. Based on the liquid level detection signal, the electromagnetic valve is turned down, so that the amount of air sucked from the air suction pipe into the micronanobubble generator is adjusted so as to ensure stable generation of micronanobubbles. When the surfactant added to the micronanobubble reaction vessel by the surfactant pump is less than an appropriate amount, then bubbles larger than micronanobubbles are generated in the micronanobubble reaction vessel. In this case, the bubble level in the micronanobubble reaction vessel ascends. This is sensed by the liquid-level meter, so that the liquid-level meter outputs a liquid level detection signal. Based on the liquid level detection signal, the discharge rate of the surfactant pump is increased so as to ensure stable generation of micronanobubbles. Therefore, according to the present embodiment, it becomes possible to ensure stable generation of micronanobubbles and to enhance wastewater treatment efficiency.

In the wastewater treatment equipment of one embodiment,
the surfactant adding section has a surfactant pump, and
the wastewater treatment equipment further comprises:
an air suction pipe connected to the micronanobubble generator,
an electromagnetic valve for adjusting an air flow rate of the air suction pipe,
a liquid-level meter for detecting a liquid level of the micronanobubble reaction vessel and outputting a liquid level detection signal, and
a control section for controlling an opening and closing degree of the electromagnetic valve and a discharge rate of the surfactant pump based on the liquid level detection signal output by the liquid-level meter.

According to the wastewater treatment equipment in the present embodiment, it becomes possible to detect whether or not micronanobubbles are stably generated in the micronanobubble reaction vessel, based on the liquid level detection signal output by the liquid-level meter upon detection of the bubble level in the micronanobubble reaction vessel. The control section controls at least one of the opening and closing degree of the electromagnetic valve and the discharge rate of the surfactant pump, based on the liquid level detection signal output by the liquid-level meter. This makes it possible to control the amount of air supplied to the micronanobubble generator and the amount of a surfactant supplied to the micronanobubble reaction vessel so as to ensure stable generation of micronanobubbles. Therefore, according to the present embodiment, micronanobubbles can stably be generated and thereby wastewater treatment efficiency can be enhanced. It has been found by an experiment that in the case where micronanobubbles are appropriately generated, the bubble level does not ascend in the micronanobubble reaction vessel.

In the method of wastewater treatment of one embodiment,
a surfactant is added to the micronanobubble reaction vessel when wastewater introduced into the micronanobubble reaction vessel contains no surfactant, whereas
no surfactant is added to the micronanobubble reaction vessel when wastewater introduced into the micronanobubble reaction vessel contains a surfactant.

According to the method of wastewater treatment in the present embodiment, when the wastewater contains a sufficient amount of a surfactant as in the case of developer waste from semiconductor factories, it is possible to reduce running cost because no surfactant is added to the micronanobubble reaction vessel.

In the method of wastewater treatment of one embodiment,
a surfactant is added to the micronanobubble reaction vessel when wastewater introduced into the micronanobubble reaction vessel contains some surfactant of less than a specified amount, whereas
no surfactant is added to the micronanobubble reaction vessel when wastewater introduced into the micronanobubble reaction vessel contains the surfactant of the specified amount or more.

According to the method of wastewater treatment in the present embodiment, when a surfactant is mixed in the wastewater but the amount thereof is not enough to sufficiently generate micronanobubbles as in the case of acid wastewater and alkaline wastewater from semiconductor factories, a necessary amount of the surfactant is added to the micronanobubble reaction vessel to compensate for the amount of excess acid or alkali. This allows constant and stable generation of micronanobubbles in the micronanobubble reaction vessel.

In the method of wastewater treatment of one embodiment,
the surfactant is at least one of an anionic surfactant, a cationic surfactant and a nonionic surfactant.

According to the method of wastewater treatment in the present embodiment, it is possible to select a desired surfactant from among the above-stated surfactants, depending on the wastewater subjected to treatment and the details of wastewater treatment. For example, it is possible to select a surfactant dissolvable in the subsequent wastewater treatment step from among an anionic surfactant, a cationic surfactant and a nonionic surfactant.

In the method of wastewater treatment of one embodiment,
the surfactant is a surfactant dissolved by wastewater treatment in a wastewater treatment section in a subsequent process step in carbon adsorption equipment.

According to the present embodiment, the surfactants are dissolved in a short period of time in the subsequent wastewater treatment section after going out of the micronanobubble reaction vessel. This makes it possible to reduce the residual surfactant in treatment water.

The method of wastewater treatment in one embodiment further comprises the step of introducing wastewater containing micronanobubbles from the micronanobubble reaction vessel into a subsequent step wastewater treatment section for performing wastewater treatment in a subsequent step, wherein
the subsequent step wastewater treatment section performs at least one treatment from among a biological treatment, a chemical treatment and a physical treatment.

According to the present embodiment, wastewater containing micronanobubbles are stably supplied to the subsequent step wastewater treatment section which performs at least one treatment from among a biological treatment, a chemical treatment and a physical treatment. Therefore, it becomes possible to enhance treatment efficiency corresponding to various wastewater treatments.

The method of wastewater treatment in one embodiment further comprises the step of increasing and maintaining a dissolved oxygen concentration in treatment water in the micronanobubble reaction vessel.

According to the method of wastewater treatment in the present embodiment, when the subsequent step wastewater treatment section performs the biological treatment, it is possible to reduce an aerating amount in an aeration tank, and thereby to achieve energy saving.

In the method of wastewater treatment of one embodiment, the subsequent step wastewater treatment section performs at lest two or more treatments from among the biological treatment, the chemical treatment and the physical treatment.

The micronanobubbles have characteristics of their sustainability in water, unlike the normal bubbles which ascend to the water level and burst. In one experimental example, microbubbles are sustained in water for three to four minutes, while nanobubbles are sustained in water for one month. Thus, the micronanobubbles have a function to increase and maintain dissolved oxygen in water. For example, in an aeration tank in the biological treatment equipment, it is possible to achieve energy saving in the aeration tank by increasing and maintaining the dissolved oxygen in water. The nanobubbles can particularly increase the activity of microorganisms by their direct action at the cell level of organisms because the nanobubbles are bubbles with a diameter of 1 micrometer or less.

EFFECTS OF THE INVENTION

According to the method of wastewater treatment in the present invention, by adding the surfactant to the micronanobubble reaction vessel, a micronanobubble generator can stably and efficiently produce the micronanobubbles in the treatment water as raw water containing the surfactant in the micronanobubble reaction vessel. Thus, the micronanobubbles make it possible to efficiently pretreat the wastewater introduced into the micronanobubble reaction vessel. Consequently, it becomes possible not only to enhance efficiency of wastewater treatment but also to reduce a treatment load on wastewater treatment equipment in a step subsequent to the pretreatment. Thereby, scale of the wastewater treatment equipment is reduced.

Figure 1:
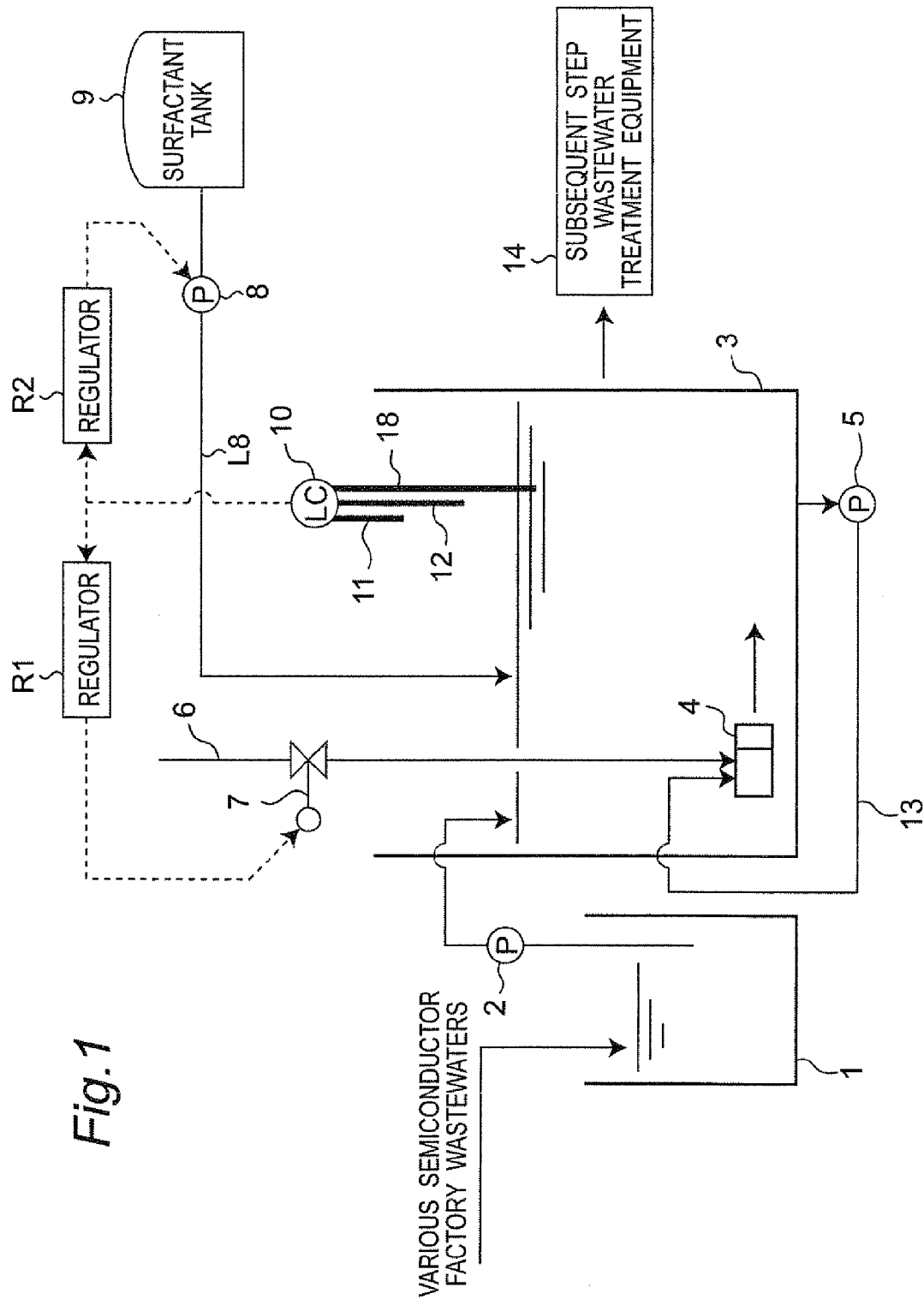
FIG. 1 shows a schematic view of wastewater treatment equipment in a first embodiment of the present invention.

DESCRIPTION OF SYMBOLS 1 adjustment tank
2 adjustment tank pump
3 micronanobubble reaction vessel
4 micronanobubble generator
5 circulating pump
6 air suction pipe
7 airflow regulating valve
8 surfactant pump
9 surfactant tank
10 liquid-level meter
11 upper electrode rod
12 lower electrode rod
13 water conveying-side pipe
14 subsequent step wastewater treatment equipment
15 biological treatment equipment
16 chemical treatment equipment
17 physical treatment equipment
18 electrode rod ground

BEST MODE FOR CARRYING OUT THE INVENTION

Hereinbelow, the present invention will be described in detail in conjunction with the embodiments with reference to the drawings.

First Embodiment

FIG. 1 shows a schematic view of wastewater treatment equipment in a first embodiment of the present invention. The wastewater treatment equipment in the first embodiment is composed of an adjustment tank 1, a micronanobubble reaction vessel 3 having a micronanobubble generator 4, a surfactant pump 8 and a surfactant tank 9 which constitute a surfactant adding section, and subsequent step wastewater treatment equipment 14 as a wastewater treatment section in a subsequent step.

In the present embodiment, for example, various semiconductor factory wastewaters are introduced into the adjustment tank 1, so as to adjust quantity and quality of the various semiconductor factory wastewaters therein. The semiconductor factory wastewaters introduced into the adjustment tank 1 are waste liquids containing organic matter like developer waste, wastewater containing fluorine as acid wastewater, or ammonium wastewater as alkaline wastewater. The wastewaters introduced into the adjustment tank 1 are not limited as long as they are wastewaters from semiconductor factories. The wastewaters from semiconductor factories are characterized in that various kinds of chemicals are mixed therein. But the wastewaters have few suspended solids in general because they contain the chemicals used for cleaning of wafers as main ingredient in clean rooms. If the wastewater introduced into the micronanobubble generator 4 has suspended solids of 1 mm or more in size, there occurs such a trouble as clogging because a micronanobubble generation port is small. In the case of the wastewater from the semiconductor factory, however, there is little possibility that such trouble as clogging occurs due to the suspended solids. In other words, the wastewater from semiconductor factories is suitable as feed water, which is to be introduced into the micronanobubble generator, as it contains few suspended solids.

The adjustment tank 1 is equipped with an adjustment tank pump 2. The adjustment tank pump 2 introduces semiconductor factory wastewater, as a treatment object, into the micronanobubble reaction vessel 3 from the adjustment tank 1. The micronanobubble reaction vessel 3 is provided with a micronanobubble generator 4 therein. An air suction pipe 6 and a water conveying-side pipe 13 are connected to the micronanobubble generator 4. The water conveying-side pipe 13 is linked to a circulating pump 5. Air is supplied to the micronanobubble generator 4 through the air suction pipe 6. Treatment water is supplied to the micronanobubble generator 4 through the water conveying-side pipe 13 by the circulating pump 5, wherein the treatment water is feed water coming from the lower side of the micronanobubble reaction vessel 3. The micronanobubble generator 4 generates micronanobubbles by using the supplied air and the feed water.

The air suction pipe 6 is equipped with an airflow regulating valve 7. The opening degree of the airflow regulating valve 7 is adjusted by a regulator R 1, wherein the regulator R 1 serves as a control section for receiving inputs of a liquid level detection signal from a liquid-level meter 10. When the opening degree of the airflow regulating valve 7 is decreased by turning around the airflow regulating valve 7, the flow rate of air is decreased, and therefore it becomes possible to easily generate micronanobubbles. On the contrary, when the opening degree of the airflow regulating valve 7 is increased, micronanobubble are not generated but general large bubbles are generated. The large bubbles accumulate as bubbles on the water surface in the upper section of the micronanobubble reaction vessel 3, but no micronanobubbles accumulate on the water surface.

A surfactant is added to the micronanobubble reaction vessel 3 via the surfactant pump 8 and a surfactant pipe L8 connected to the surfactant tank 9. Addition of the surfactant effectively increases generation of micronanobubbles in the micronanobubble reaction vessel 3. The addition of the surfactant to the micronanobubble reaction vessel 3 as well as adjustment of the opening degree of the airflow regulating valve 7 allows micronanobubbles to be appropriately generated in the treatment water introduced into the micronanobubble reaction vessel 3. The surfactant includes an anionic surfactant, a cationic surfactant and a nonionic surfactant, for example. It is preferable to select a surfactant dissolvable in the next wastewater treatment process.

When the treatment water containing the surfactant is compared with the treatment water containing no surfactant in the micronanobubble reaction vessel 3, the treatment water containing the surfactant is considerably higher in generation efficiency of micronanobubbles.

In the present embodiment, accordingly, when bubbles larger than micronanobubbles are generated at the liquid level of the treatment water in the micronanobubble reaction vessel 3 and then touch the liquid-level meter 10, the liquid-level meter 10 outputs an electric signal, i.e., a liquid level detection signal. The liquid level detection signal output by the liquid-level meter 10 is input into a regulator R2 serving as a control section. The surfactant pump 8 attached to the surfactant tank 9 is operated on the basis of the control signal of the regulator R2. Thus, the amount of the surfactant supplied to the micronanobubble reaction vessel 3 is automatically controlled so as to ensure stable generation of micronanobubbles.

The liquid-level meter 10 has an upper electrode rod 11, a lower electrode rod 12 and an electrode rod ground 18. In the case where the above-stated normal large bubbles (normal bubbles other than micronanobubbles) are generated, the bubbles ascend from the liquid level of the treatment water. Then, the normal-size bubbles first come into contact with the lower electrode rod 12 to indicate a state of electric conduction. Consequently, the liquid-level meter 10 outputs a first liquid level detection signal, which allows a regulator R1 to execute a first reduction control over the airflow regulating valve 7 so as to decrease the suction air amount in the micronanobubble generator 4. At the same time, in response to the first liquid level detection signal from the liquid-level meter 10, the regulator R2 executes a first control over the surfactant pump 8 so as to increase the adding amount of the surfactant.

However, if the normal large bubbles are still generated at the liquid level of the treatment water regardless of the first control, and end up coming into contact with the upper electrode rod 11 to indicate electric conduction, then the liquid-level meter 10 outputs a second liquid level detection signal. In response to the second liquid level detection signal, the regulator R1 executes the second reduction control over the airflow regulating valve 7 to reduce the suction air amount in the micronanobubble generator 4. At the same time, in response to the second liquid level detection signal from the liquid-level meter 10, the regulator R2 executes the second control over the surfactant pump 8 to increase the adding amount of the surfactant.

As a result of the first control, if the normal large bubbles decrease at the liquid level of the treatment water and the large bubbles are no longer in contact with the upper electrode rod 11 and the lower electrode rod 12, then the liquid-level meter 10 outputs a third liquid level detection signal. The third liquid level detection signal is input into the regulator R1, so that the regulator R1 increases the opening degree of the airflow regulating valve 7. Thereby, a relative amount of the micronanobubbles is increased. At the same time, the third liquid level detection signal is also input into the regulator R2, so that the regulator R2 controls the surfactant pump 8 so as to decrease the adding amount of the surfactant.

In this way, the amount of air supplied to the micronanobubble generator 4 and the amount of the surfactant supplied to the micronanobubble reaction vessel 3 are controlled so that generation of the micronanobubbles are appropriately maintained.

Generally, various wastewaters from semiconductor factories contain surfactants although the amount thereof is different from each other. However, in the case where the amount of the surfactants contained in the wastewaters is not appropriate, the generation amount of micronanobubbles is dramatically decreased.

Specifically, when the amount of the surfactant contained in the wastewater varies in the micronanobubble reaction vessel 3, the generation amount of micronanobubbles changes in the micronanobubble reaction vessel 3. Therefore, as described above, a necessary amount of micronanobubble generation is secured not only by adjusting the opening degree of the airflow regulating valve 7 but also by adjusting the added amount of the surfactant with use of the surfactant pump 8. Therefore, in the present embodiment, if the amount of semiconductor factory wastewaters should change, it becomes possible to ensure stable generation of micronanobubbles in the micronanobubble reaction vessel 3.

It should be noted that as the micronanobubble generator 4, any micronanobubble generator available in the market can be used regardless of manufacturers. For example, it is possible to adapt a micronanobubble generator made by Nanoplanet Research Institute Corporation. As other available products for the micronanobubble generator 4, it is also possible to adapt a micronanobubble generator by Aura Tec Corporation, a microbubble water generating apparatus by Seika Corporation and a microbubble water generating apparatus by Shigenkaihatsu Corporation. The micronanobubble generator 4 may be selected from among these products depending on its purpose.

In the micronanobubble reaction vessel 3, the treatment water is subjected to microbubble treatment with use of the micronanobubbles generated from the micronanobubble generator 4. Then, the treatment water treated with the micronanobubbles generated from the micronanobubble generator 4 in the micronanobubble reaction vessel 3 is introduced into the subsequent step wastewater treatment equipment 14 in the subsequent step wastewater treatment section. The micronanobubble treatment in the micronanobubble reaction vessel 3 reduces a load on the subsequent step wastewater treatment equipment 14.

Description is given of three kinds of bubbles, here.
 (i) normal bubbles rise in water to end up bursting on the water surface and disappear.

(ii) micro bubbles, which are fine bubbles with a diameter of 50 microns (μm) or less, shrink in water and end up disappearing (completely dissolving).

(iii) Nanobubbles, which are smaller than microbubbles with a diameter of 1 micrometer or less (e.g., diameter of 100 to 200 nm), are said to be able to keep on existing in water on a permanent basis.

Accordingly, the term "micronanobubbles" refers to bubbles which are a mixture of the microbubbles and the nanobubbles.

According to the present embodiment, as described before, a surfactant is added to the micronanobubble reaction vessel 3 by using the surfactant tank 9 and the surfactant pump 8 constituting the surfactant adding section, so that micronanobubbles can stably be generated with high efficiency in the micronanobubble reaction vessel 3. Thus the wastewater introduced into the micronanobubble reaction vessel 3 is efficiently pretreated with use of the micronanobubbles. Therefore, it becomes possible to reduce a load on the subsequent step wastewater treatment equipment 14 and to achieve reduction in scale of the subsequent step wastewater treatment equipment 14.

Second Embodiment

Figure 2:
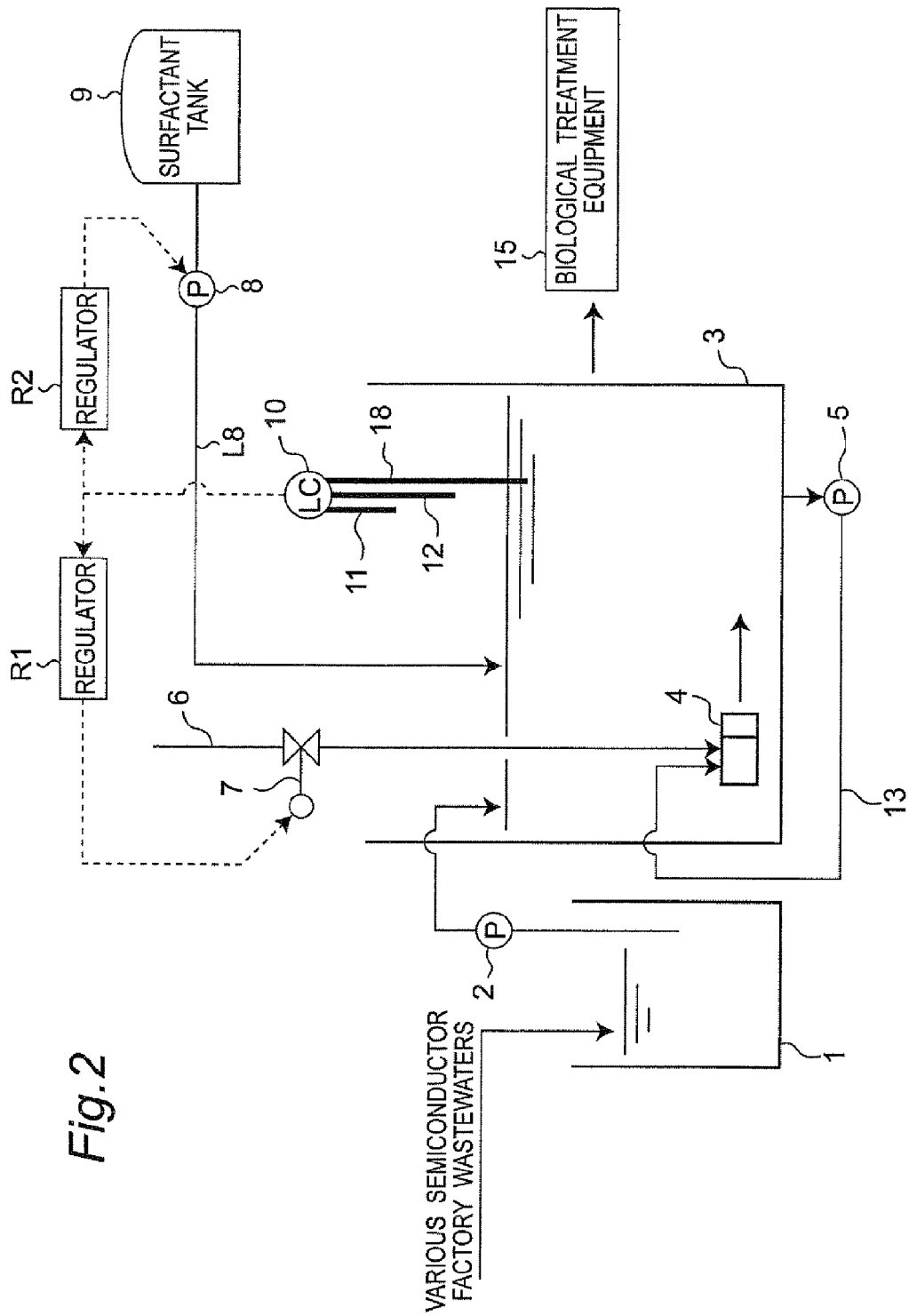
FIG. 2 shows a schematic view of wastewater treatment equipment in a second embodiment of the present invention.

Next, FIG. 2 shows wastewater treatment equipment in a second embodiment of the present invention. The second embodiment is different from the above-stated first embodiment only in the point that biological treatment equipment 15 is installed in place of the subsequent step wastewater treatment equipment 14 placed subsequent to the micronanobubble reaction vessel 3 in the first embodiment. Consequently, in the second embodiment, the component parts identical to those in the first embodiment are designated by identical reference numerals, and description will be omitted except the component parts different from the first embodiment.

Micronanobubbles particularly have not only the property of oxidizing organic matter but also the property of continuously maintaining dissolved oxygen in water with use of nanobubbles. According to the present embodiment, therefore, it becomes possible to reduce a load of treating organic matter on the biological treatment equipment 15 which is placed subsequent to the micronanobubble reaction vessel 3. Also, according to the present embodiment, it becomes possible to save the amount of aerated air in an aeration tank which is installed as a biological treatment tank in the biological treatment equipment 15. The nanobubbles in particular are said to exist in treatment water for over a month. Therefore, the nanobubbles dissolve in the treatment water to maintain the dissolved oxygen in the aerating tank. This makes it possible to save the amount of aerated air. Specifically, the present embodiment can be applied to the biological treatment equipment for treating developer waste as semiconductor factory wastewater.

As the biological nitrification equipment for developer waste, there is equipment provided with combination of a normal aerating tank and a settling tank, or equipment provided with an aerating tank utilizing a submerged membrane and no settling tank. The present embodiment is applicable to either one.

Third Embodiment

Figure 3:
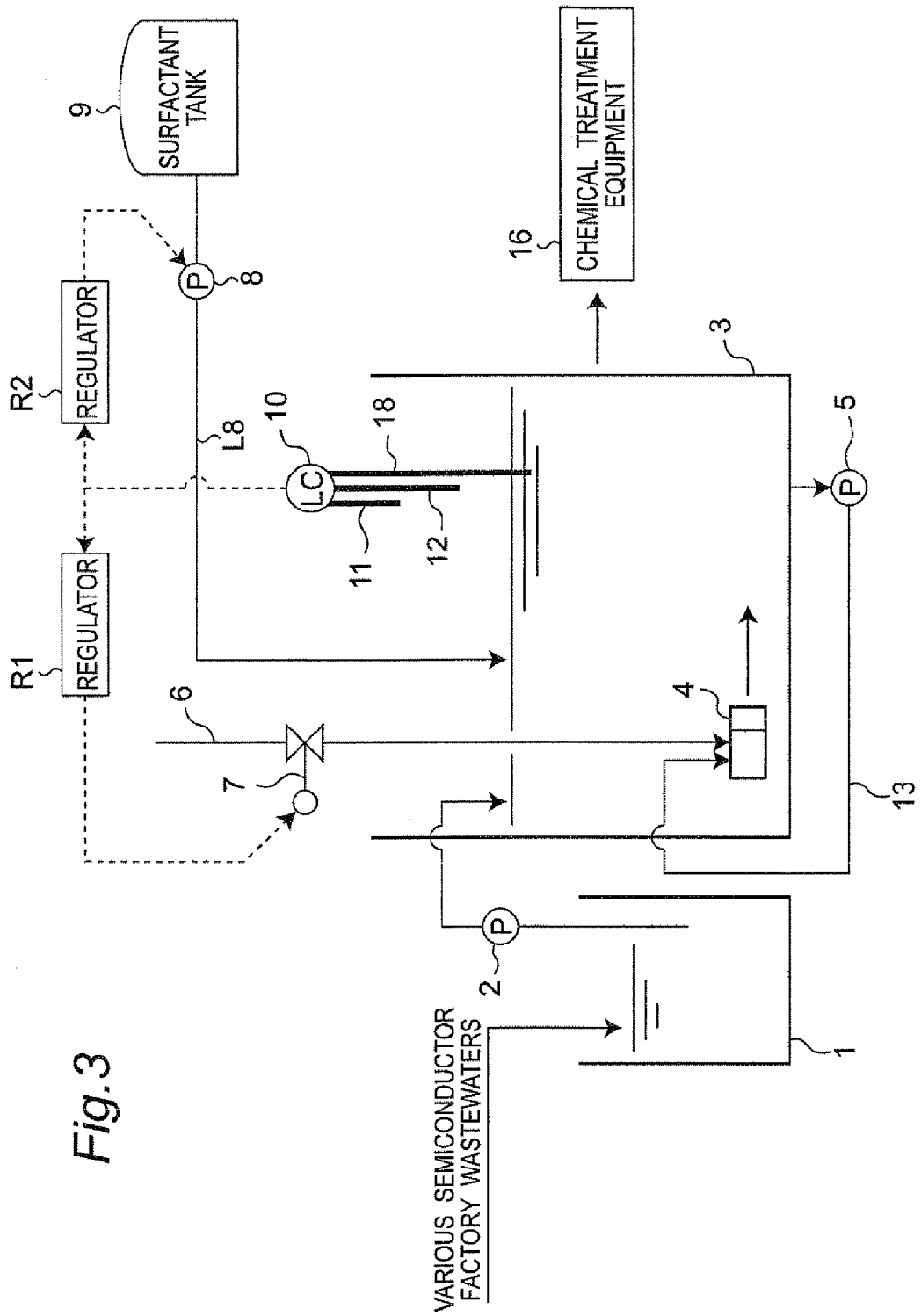
FIG. 3 shows a schematic view of wastewater treatment equipment in a third embodiment of the present invention.

FIG. 3 shows wastewater treatment equipment in a third embodiment of the present invention. The third embodiment is different from the above-stated first embodiment only in the point that chemical treatment equipment 16 is installed in place of the subsequent step wastewater treatment equipment 14 placed subsequent to the micronanobubble reaction vessel 3 in the first embodiment. Consequently, in the third embodiment, the component parts identical to those in the first embodiment are designated by identical reference numerals, and description will be omitted except the component parts different from the first embodiment.

It has been known that the micronanobubbles act in a catalytic way to advance chemical reaction. According to the third embodiment, therefore, the catalytic action of the micronanobubbles makes it possible to faster advance the chemical reaction in the chemical treatment equipment 16 placed subsequent to the micronanobubble reaction vessel 3 than the normal chemical reaction.

The microbubbles keep on existing in the treatment water for a few minutes. The nanobubbles are said to exist in treatment water for over a month. These bubbles make it possible to achieve effective catalytic action for chemical reaction in the chemical treatment equipment 16. Specifically, the chemical treatment equipment 16 corresponds to chemical treatment equipment for treating hydrofluoric wastewater as semiconductor factory wastewater. According to the third embodiment, the chemical reaction is effectively conducted in the chemical treatment equipment when the chemical treatment equipment 16 is used for chemical treatment equipment in which calcium hydroxide (slaked lime) is added to hydrofluoric wastewater to form calcium fluoride so that the fluorine in hydrofluoric wastewater is treated, for example.

Fourth Embodiment

Figure 4:
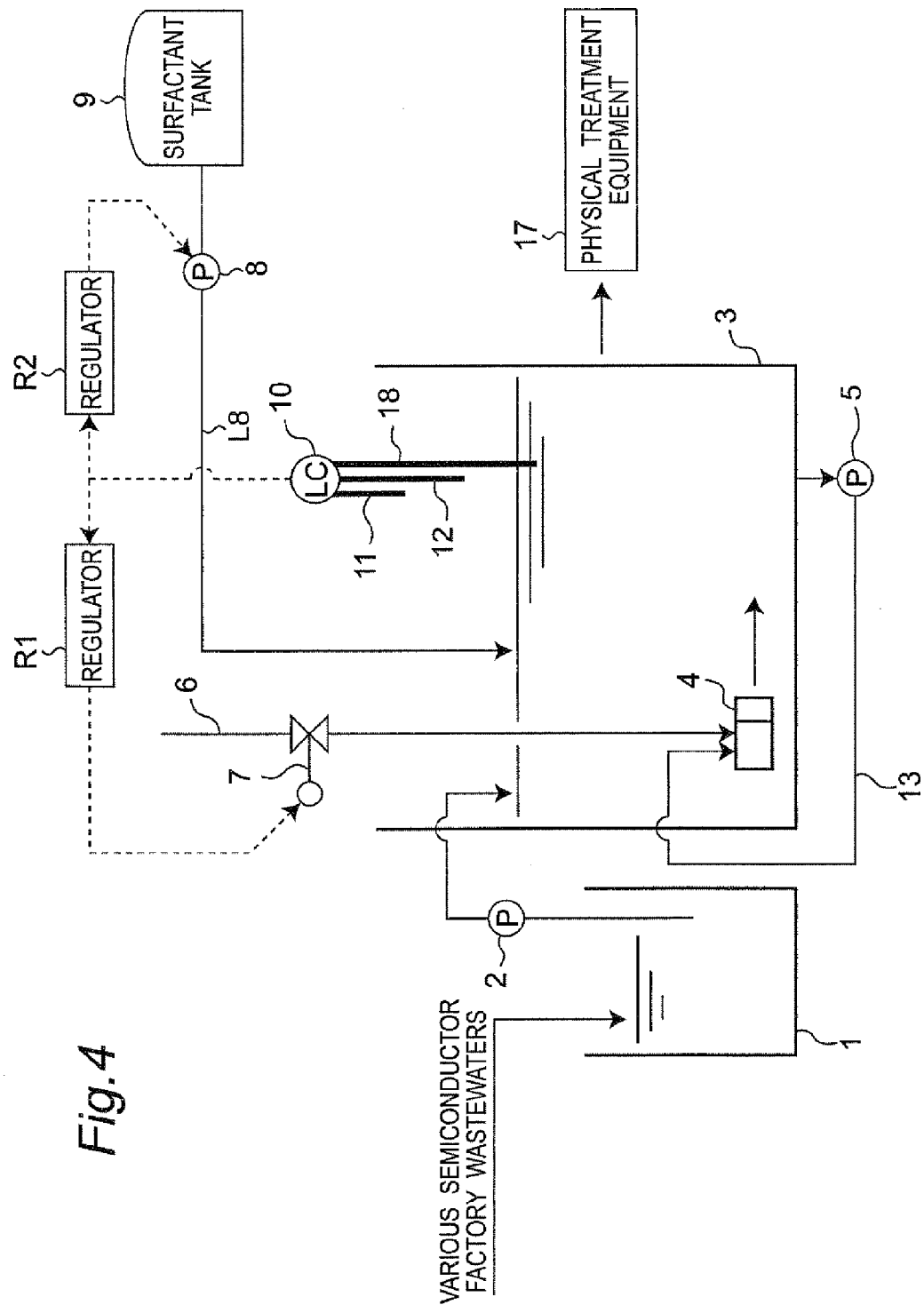
FIG. 4 shows a schematic view of wastewater treatment equipment in a fourth embodiment of the present invention.

FIG. 4 shows wastewater treatment equipment in a fourth embodiment of the present invention. The fourth embodiment is different from the above-stated first embodiment only in the point that physical treatment equipment 17 is installed in place of the subsequent step wastewater treatment equipment 14 placed subsequent to the micronanobubble reaction vessel 3 in the first embodiment. Consequently, in the fourth embodiment, the component parts identical to those in the first embodiment are designated by identical reference numerals, and description will be omitted except the component parts different from the first embodiment.

The micronanobubbles have a contamination component adsorption action. According to the fourth embodiment, therefore, the adsorption action of the micronanobubbles can reduce a load of organic matter as contamination, wherein the organic matter is attached to filters provided in the physical treatment equipment 17 placed subsequent to the micronanobubble reaction vessel 3, for example. As the result, it becomes possible to reduce the number of back washing operations per unit period, which are performed on the high-speed filters. Moreover, according to the present embodiment, the contamination components in treatment water can be absorbed and treated by using micronanobubbles. This makes it possible to reduce replacement frequency of filter media in high-speed filters.

Fifth Embodiment

Figure 5:
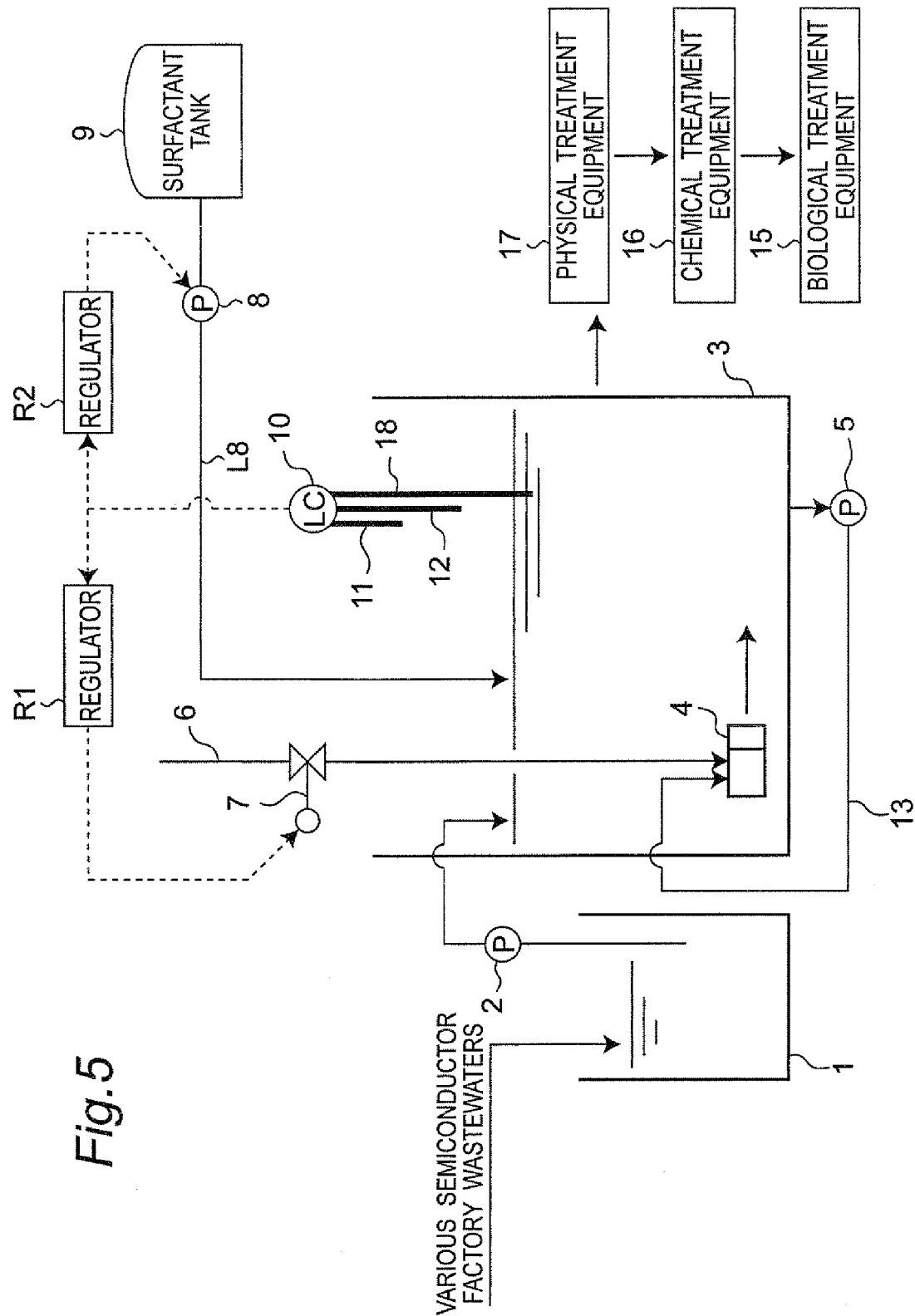
FIG. 5 shows a schematic view of wastewater treatment equipment in a fifth embodiment of the present invention.

FIG. 5 shows wastewater treatment equipment in a fifth embodiment of the present invention. The fifth embodiment is different from the above-stated first embodiment only in the point that the physical treatment equipment 17, the chemical treatment equipment 16 and the biological treatment equipment 15 are installed in place of the subsequent step wastewater treatment equipment 14 placed subsequent to the micronanobubble reaction vessel 3 in the first embodiment. Consequently, in the fifth embodiment, the component parts identical to those in the first embodiment are designated by identical reference numerals, and description will be omitted except the component parts different from the first embodiment.

Micronanobubbles have the adsorption action to components in liquid, the catalytic action to chemical reaction and the oxidization property to organic matter. In the fifth embodiment, therefore, it becomes possible to reduce treatment loads on the physical treatment equipment 17, the chemical treatment equipment 16 and the biological treatment equipment 15 which are placed subsequent to the micronanobubble reaction vessel 3. As the result, it becomes possible to reduce the scale of the physical treatment equipment 17, the chemical treatment equipment 16 and the biological treatment equipment 15, as a whole.

Experimental Example

Experimental equipment was produced, which had a configuration identical to that of the wastewater treatment equipment in the first embodiment shown in FIG. 1. In the experimental equipment, the adjustment tank 1 had the capacity of 1,000 liter, the micronanobubble reaction vessel 3 had the capacity of 1,000 liter, and the capacity of the surfactant tank 9 had the capacity of 200 liter.

The experimental equipment had a trial run for about two days. Thereafter, developer waste was continuously introduced into the adjustment tank 1. The developer waste was waste discharged from a semiconductor factory with a dissolved oxygen concentration of 1.2 ppm. After three days elapsed to stabilize the water quality, the dissolved oxygen concentration of the treatment water was measured in the outlet port of the micronanobubble reaction vessel 3. The measurement result was 6 ppm.

The invention claimed is:

1. A method of wastewater treatment, comprising the steps of:
   introducing wastewater into a micronanobubble reaction vessel having a micronanobubble generator; and
   adding a surfactant to the micronanobubble reaction vessel,
   wherein
   air is sucked from an air suction pipe connected to the micronanobubble generator into the micronanobubble generator,
   a surfactant is added to the micronanobubble reaction vessel from a surfactant pump, and
   a liquid level in the micronanobubble reaction vessel is detected by a liquid-level meter, and based on a liquid level detection signal output by the liquid-level meter, at least one of an opening and closing decree of an electromagnetic valve for adjusting an air flow rate of the air suction pipe and a discharge rate of the surfactant pump is controlled.

2. Wastewater treatment equipment, comprising:
   a micronanobubble reaction vessel for receiving wastewater and having a micronanobubble generator; and
   a surfactant adding section for adding a surfactant to the micronanobubble reaction vessel,
   wherein
   the surfactant adding section has a surfactant pump, and
   the wastewater treatment equipment further comprises:
   an air suction pipe connected to the micronanobubble generator,
   an electromagnetic valve for adjusting an air flow rate of the air suction pipe,
   a liquid-level meter for detecting a liquid level of the micronanobubble reaction vessel and outputting a liquid level detection signal, and
   a control section for controlling an opening and closing degree of the electromagnetic valve and a discharge rate of the surfactant pump based on the liquid level detection signal output by the liquid-level meter.

3. The method of wastewater treatment set forth in claim 1, wherein
   a surfactant is added to the micronanobubble reaction vessel when wastewater introduced into the micronanobubble reaction vessel contains no surfactant, whereas
   no surfactant is added to the micronanobubble reaction vessel when wastewater introduced into the micronanobubble reaction vessel contains a surfactant.

4. The method of wastewater treatment set forth in claim 1, wherein
   a surfactant is added to the micronanobubble reaction vessel when wastewater introduced into the micronanobubble reaction vessel contains some surfactant of less than a specified amount, whereas
   no surfactant is added to the micronanobubble reaction vessel when wastewater introduced into the micronanobubble reaction vessel contains the surfactant of the specified amount or more.

5. The method of wastewater treatment set forth in claim 1, wherein
   the surfactant is at least one of an anionic surfactant, a cationic surfactant and a nonionic surfactant.

6. The method of wastewater treatment set forth in claim 1, wherein
   the surfactant is a surfactant dissolved by wastewater treatment in a wastewater treatment section in a subsequent process step in active carbon adsorption equipment.

7. The method of wastewater treatment set forth in claim 1, further comprising the step of introducing wastewater containing micronanobubbles from the micronanobubble reaction vessel into a subsequent step wastewater treatment section for performing wastewater treatment in a subsequent step, wherein
   the subsequent step wastewater treatment section performs at least one treatment from among a biological treatment, a chemical treatment and a physical treatment.

8. The method of wastewater treatment set forth in claim 1, further comprising the step of increasing and maintaining a dissolved oxygen concentration in treatment water in the micronanobubble reaction vessel.

9. The method of wastewater treatment set forth in claim 7, wherein
   the subsequent step wastewater treatment section performs at least two or more treatments from among the biological treatment, the chemical treatment and the physical treatment.

* * * * *